United States Patent [19]

Chotard

[11] Patent Number: 4,919,884
[45] Date of Patent: Apr. 24, 1990

[54] MODULAR NUCLEAR FUEL ELEMENT, MODULAR CAPSULE FOR SUCH ELEMENT AND METHOD FOR SUCH ELEMENT AND METHOD FOR MANUFACTURING SUCH MODULAR CAPSULE

[75] Inventor: Alain Chotard, Neuville sur Saone, France

[73] Assignees: Framatome, Courbevoie; Cogema, Velizy Villacoublay, both of France

[21] Appl. No.: 210,443

[22] Filed: Jun. 23, 1988

[30] Foreign Application Priority Data

Jun. 25, 1987 [FR] France ................................ 87 08988

[51] Int. Cl.⁵ .............................................. G21C 3/00
[52] U.S. Cl. ..................................... 376/419; 376/420; 376/426; 376/431; 29/723
[58] Field of Search ............... 376/409, 419, 420, 426, 376/431; 29/723

[56] References Cited

U.S. PATENT DOCUMENTS

| | | | |
|---|---|---|---|
| 3,100,742 | 8/1963 | McGeary | 376/419 |
| 3,192,621 | 7/1965 | Bauer | 376/419 |
| 3,197,381 | 7/1965 | Blake | 376/419 |
| 4,470,947 | 9/1984 | McCartny | 376/213 |

FOREIGN PATENT DOCUMENTS

| | | |
|---|---|---|
| 0145514 | 6/1985 | European Pat. Off. . |
| 1489643 | 8/1969 | Fed. Rep. of Germany . |
| 3517404 | 11/1986 | Fed. Rep. of Germany . |
| 2012583 | 3/1970 | France . |

*Primary Examiner*—Donald P. Walsh
*Attorney, Agent, or Firm*—Pollock, Vande Sande & Priddy

[57] ABSTRACT

The fuel element comprises a plurality of modular capsules (5) arranged in sequence axially within a sheath (2). Each of the capsules (5) comprises a tubular case (10) closed at both ends by a porous element (13, 14) and enclosing a stack of pellets (11) in contact with the inner surface of the case (10) without radial clearance. The outside diameter of the capsules (5) is such that a very small radial clearance exists between the outer surface of the capsule (5) and the inner surface of the sheath (2).

11 Claims, 2 Drawing Sheets

MODULAR NUCLEAR FUEL ELEMENT, MODULAR CAPSULE FOR SUCH ELEMENT AND METHOD FOR SUCH ELEMENT AND METHOD FOR MANUFACTURING SUCH MODULAR CAPSULE

FIELD OF THE INVENTION

The invention relates to a nuclear fuel element in modular form, a modular capsule for such an element and a method for manufacturing a modular capsule.

BACKGROUND OF THE INVENTION

Nuclear fuel elements are known which are adapted to be grouped in the form of parallel clusters or assemblies constituting, by their juxtaposition, the core of a nuclear reactor. Such fuel elements comprise a tubular sheath closed at both ends, composed of a material resisting creep and corrosion under the action of the coolant at high pressure and high temperature of the nuclear reactor, and enclosing pellets stacked in the axial direction of the sheath, said pellets being generally in sintered form and of a nuclear fuel material such as uranium oxide or a mixed uranium and plutonium oxide.

The sheath of the nuclear fuel element has in particular the function of preventing the escape of the gaseous product of fission in the coolant fluid, and the contact between the fuel material and the coolant which would result in chemical reactions. The sheath also performs the mechanical function of maintaining the stack of pellets and resisting the pressure difference between the interior and exterior of the fuel element.

The long-term performance of nuclear fuel elements, and in particular those employed in a nuclear reactor which is cooled and moderated with light water depends on a phenomenon known by the name of pellet-sheath interaction. This interaction results from the combination of a mechanical action, namely, the stressing of the sheath upon swelling and expansion of the pellets under irradiation, and a chemical action due in particular to the products of fission liberated by the pellets under irradiation.

Various solutions have been proposed for limiting to the extent possible the pellet-sheath interaction or the consequences thereof on the behavior of the fuel elements.

For example it has been proposed in French Patent Application No. 2 551 905, to place inside the sheath of the fuel element an open tube for maintaining the stack of pellets in at least a part of its length. This tube permits separating the sheath from the stack and is separated from the sheath by a radial gap of sufficient extent to retard the contact between the tube and the sheath when the fuel pellets swell under irradiation.

The production of such a fuel element presents difficulties in that this element is of great length, for example on the order of 40 meters, as in the case of nuclear reactors cooled with pressurized water. It is indeed difficult to ensure manufacture and mounting within the sheath of a tube of great length in such manner as to provide a small and constant radial clearance throughout the length of the tube between the latter and the inner surface of the sheath.

The production of a stack of pellets within the tube of great length is also a lengthy operation which is difficult to carry out and requires pellets whose diameter is slightly less than the inside diameter of the tube, the presence of a certain radial clearance by construction being indispensable. This radial clearance reduces the efficiency of the thermal exchanges between the pellets and the sheath so that it is necessary to increase the temperature of the pellets in operation in order to maintain the thermal flux at the required value.

Furthermore, it may be necessary to employ nuclear fuel elements which comprise regions whose composition differs depending on the position of these regions in the axial direction of the fuel element.

For example, it may be desirable to employ fuel elements whose enrichment of pellets varies in the axial direction of the rod or fuel elements whose regions close to the ends comprise pellets composed of a material such as a fertile material for example a depleted or natural uranium oxide $UO_2$ or thorium oxide $ThO_2$ for constituting the axial covers at the upper and lower partsof the core.

It may also be necessary to employ fuel elements comprising, in the central part thereof, elements termed burnable poisons capable of absorbing the neutrons. Such burnable poison elements may, for example, be in the form of small plates each of which is interposed between two successive nuclear fuel pellets It is clear that the manufacture of such composite fuel elements is much more complex than the manufacture of homogeneous fuel elements, since pellets or plates of different types must be introduced in the sheath of the fuel element in a predetermined number and order. It is also necessary to have available stocks of pellets of different types, which complicates the management of the fuel producing factory.

SUMMARY OF THE INVENTION

An object of the invention is therefore to propose a nuclear fuel element comprising a tubular sheath closed at both ends, composed of a material resisting creep and corrosion under the action of a coolant at high pressure and high temperature of a nuclear reactor and enclosing pellets of a material having an influence on the nuclear reaction in the reactor, at least a part of which is composed of a nuclear fuel material, said fuel element permitting the limiting of the pellet-sheath interaction notwithstanding a reduced clearance between the pellets and the sheath and also permitting the simplification of the manufacture of the composite fuel elements comprising successive regions of different types in the axial direction The nuclear fuel element according to the invention comprises for this purpose a plurality of modular capsules disposed in sequence in the axial direction within the sheath, each of the modular capsules being constituted by a tubular case closed at both ends by a porous element, and by a stack of pellets inserted with no radial clearance inside the case whose outside diameter is such that the radial clearance between the outer surface of the capsule and the inner surface of the sheath is very small.

BRIEF DESCRIPTION OF THE DRAWINGS

In order to explain the invention, there will now be described, with reference to the accompanying drawings, an embodiment of the nuclear fuel element according to the invention, an embodiment of a modular capsule for this fuel element and the method for manufacturing a modular capsule.

DESCRIPTION OF PREFERRED EMBODIMENT

Figure 1:
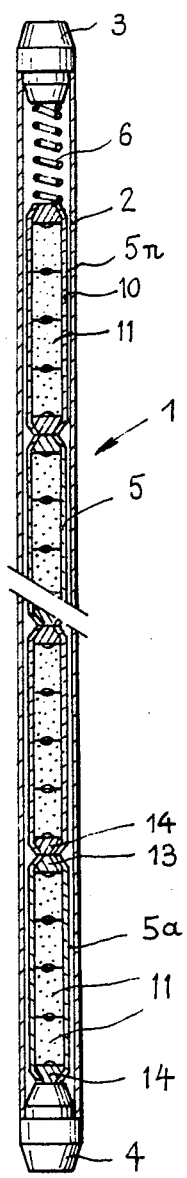
FIG. 1 is an axial sectional view of a nuclear fuel element according to the invention.

FIG. 1 shows a fuel element, 1 comprising an outer tubular sheath 2 of great length relative to its diameter, and closed at both ends by plugs 3 and 4. The fuel element according to the invention is so arranged as to have the same dimensions as a prior art element employed in pressurized-water nuclear reactors at present in service.

Such a fuel element, termed fuel rod, comprises a sheath composed of a zirconium alloy (Zircaloy) whose length is in the range of 40 meters for an outside diameter on the order of 0.01 meter.

The outer sheath 2 of the fuel element according to the invention is made from a tube of Zircaloy identical to those employed as a sheath for prior art fuel elements in which fuel pellets are stacked.

The outer sheath 2 encloses a plurality of capsules 5 which will be described in more detail with reference to FIG. 2.

The capsules 5 of cylindrical shape are stacked in sequence inside the sheath 2 along the axial direction of the latter.

To construct the fuel element shown in FIG. 1, the plug 4 is first fixed in a sealed manner to the corresponding end of the sheath 2 by welding. A first capsule 5a is inserted in the sheath and its lower end comes to bear against the plug 4. The other capsules are stacked in succession against one another up to the last capsule 5n located in the upper part of the fuel element. The sheath 2 of the fuel element is then closed by an upper plug 3 with interposition of a spring 6 between the last capsule 5n and the plug 3. During the welding of the plug to the end of the sheath 2, an atmosphere of helium under pressure is maintained within the sheath 2.

Figure 2:
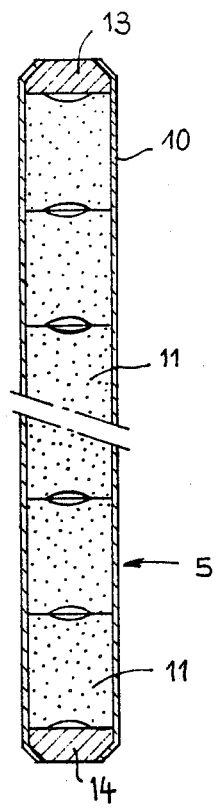
FIG. 2 is an axial sectional view, on an enlarged scale, of a modular capsule of the fuel element shown in FIG. 1.

As shown in FIG. 2, each of the capsules 5 comprises a tubular case 10 in which are stacked sintered pellets 11 of a fuel material such as uranium oxide or a mixed uranium and plutonium oxide or a mixed uranium and gadolinium oxide, a mixed uranium and thorium oxide or a mixture of said oxides.

The tubular case or sheath of the modular capsule 5 is closed at both ends by plugs 13 and 14 of porous material.

The case 10 is in contact by its inner surface with the lateral surface of the pellets 11 throughout the length of the capsule. In other words, there is no radial clearance between the pellets 11 and the tubular case 10. The tubular case 10 has an outside diameter which is only very slightly less than the inside diameter of the sheath 2. There is, after the assembly of the fuel element 1, a very small radial clearance 12 between the outer surface of the capsule 5 and the inner surface of the sheath 2. This radial clearance may range from a few hundredths to one or two tenths of a millimeter.

The outside diameter of the modular capsule 5 corresponds to the diameter of the pellets 11 plus twice the thickness of the tubular case 10.

The case 10 is made from a tube of Zircaloy having a wall thickness of 0.15 to 0.30 mmm.

Consequently, there may easily be provided between the capsules and the sheath a clearance 12 of a small and perfectly predetermined value by judiciously choosing the diameter of the pellets and the thickness of the case 10.

The limited length of the capsules relative to the total length of the fuel element facilitates the mounting of the capsules, even if the remaining clearance 12 is very small, relative to the mounting of a tube of great length inside a sheath in the case of a double-sheathed rod of the prior art.

The tubular case 10 is in contact with the fuel pellets 11 and the clearance between the pellets and the sheath is limited to the clearance 12 provided by construction between the capsules and the outer sheath 2. This reduced clearance enables the temperature of the fuel pellets 11 to be reduced in service in the nuclear reactor. The thickness of the tubular case 10 of the capsules may also be increased or a absorbing layer may be applied on this tubular case, without notably reducing the thermal transfers between the fuel pellets and the outer sheath.

In addition to these advantages, the fuel element according to the invention comprising modular capsules in which the fuel pellets are in contact with the inner wall of the case of the capsule, presents, relative to the double-sheathed rods of the prior art, the advantage of reducing the risk of introduction of affragment of fuel material, such as the $UO_2$, in the clearance between the pellets and the sheath. Such a fragment, when it is placed in contact with the inner surface of the sheath, may result in a piercing of the sheath by mechanical interaction during the operation of the reactor.

The porous pellets 13 and 14 closing the capsule 15 may be advantageously formed by a material which absorbs the gaseous products of fission. These porous end pellets could also be formed by the pellets 11 located a the ends of the capsule 5.

The ends of the tubular case 10 are formed over onto the capsules 13 and 14 so that they retain these capsules and the pellets 11 of the stack.

In order to provide fuel elements having successive different regions in the axial direction, the capsules 5 may be made in several types.

For example, there may be envisaged the manufacture of capsules 5 enclosing fuel pellets 11 having variable degrees of enrichment.

In forming the stack of capsules 5 in the sheath 2 when manufacturing the fuel element 1, capsules may be chosen in succession which enclose fuel pellets having different enrichment contents. It will be clear that such procedure is much quicker and simpler than the prior method consisting in stacking fuel pellets having different enrichments in a sheath constituted by a tube of great length. It is also possible, in case it is desired to produce composite fuel elements, to manufacture modular capsules 5 enclosing pellets or other elements of different types. Thus, there may be provided capsules 5 filled with pellets composed of a fertile material, such as depleted or natural uranium oxide, or such as thorium oxide $ThO_2$, these capsules being adapted to constitute the end parts for axial covers in the core of the reactor.

It is also possible to manufacture capsules 5 enclosing burnable poisons, these capsules being thereafter preferably placed in the central part of the fuel element 1.

It is also possible to carry out these three possibilities simultaneously for the realization of composite fuel rods having an enrichment which varies by regions.

In any case, it is sufficient to place the corresponding capsules 5 in the desired cases axially of the rod 1.

Reference will now be made to FIGS. 3 to 6 to describe the method for manufacturing a modular capsule of a fuel element according to the invention.

Figure 3:
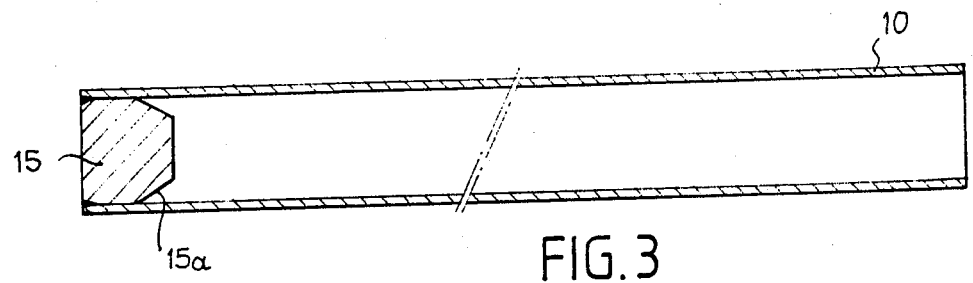
FIGS. 3, 4, 5 and axial sectional views of a modular capsule in the course of the different stages of manufacture of this capsule.

FIG. 3 shows the tubular case 10 of such a capsule formed from a tube of Zircaloy whose wall thickness is between 0.15 and 0.30 mm which may be optionally covered with a burnable poison.

In a first stage, one of the ends of the tubular case 10 is closed by a plug 15 having a chamfer 15a which faces toward the interior of the tube. In this first step, the plug 15 is welded to the end of the tubular case 10.

Figure 4:
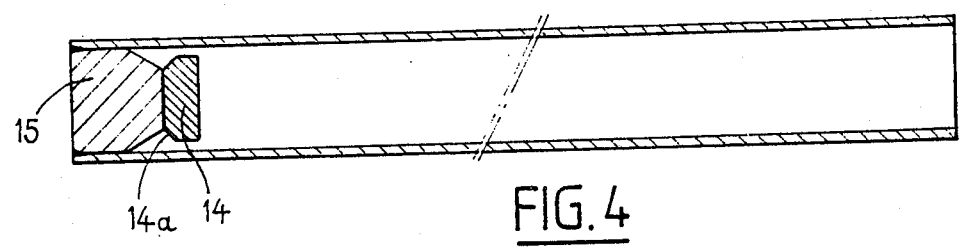

In a second step shown in FIG. 4, a porous pellet 14 a chamfer 14a is inserted in the tube 10 in such manner that the chamfer 14a faces toward the plug 15.

pellet 14 is placed in the tube in contact with the plug 15.

Figure 5:
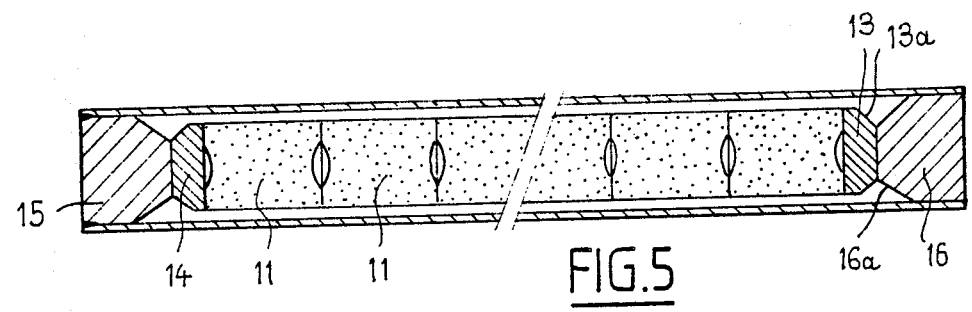

In a third step shown in FIG. 5, pellets 11 composed of a fuel material (or a material of another type) are inserted in succession in the tube 10 following on the porous pellet 14. When the required number of fuel pellets 11 is inserted in the tube 10, a second porous pellet 13 having a chamfer 13a is placed in contact with the last fuel pellet 11 inserted in the tube, in such manner that the chamfer 13a faces toward the exterior of the tube. A plug 16 having a chamfer 16a is then inserted in the end of the tube 10, with the chamfer 16a facing toward the porous pellet 13. The plug 16 is welded to the tube 10 in the same way as the plug 15.

In a fourth step, the assembly shown in FIG. 5 comprising the tube 10 closed by the plugs 15 and 16, is placed in a vessel in which a high pressure and high temperature is established. This operation, of known type, produces a deformation of the sheath which is applied against the pellets and in such manner as to be in contact with these pellets throughout its inner surface.

Figure 6:
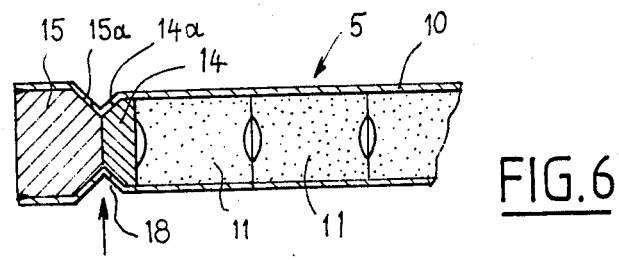

As can be seen in FIG. 6, at the end of this fourth step, there is no longer any radial clearance between the pellets 11 and the inner surface of the tubular case 10. Furthermore, a neck 18 is formed in the region of the chamfer 14a of the porous pellet 14 and the chamfer 15a of the plug 15.

In the same way, a neck is formed in the region of the chamfers 13a and 16a of the pellet 13 and the plug 16, respectively.

A cutting or cropping of the case 10 is then effected at the bottom of the neck 18 and at the bottom of the corresponding neck at the other end of the capsule. This cutting separates the plugs 15 and 16 from the capsule 5. This capsule is then in the form shown in FIG. 2.

The fuel element 1 may be produced by the operations described hereinbefore.

The fuel element obtained then has the advantage of considerably limiting the pellet-heath interaction of the fuel element while maintaining a very good thermal efficiency of this fuel element.

Furthermore, the modular construction of the fuel element according to the invention permits easily obtaining enrichment regions which vary along the axial direction of the rod and rods having regions of different types along their length.

The length of each modular capsule employed for manufacturing the fuel element will be chosen for both facilitating the manufacture of the capsules and the assembly of the fuel element.

The modular capsules may be enclosed stacked elements of a type other than those mentioned.

The manufacture of fuel elements and capsules of dimensions different from those indicated hereinbefore is also possible.

Other manners of manufacturing capsules enclosing pellets which are in contact with the inner wall of the tubular case of the capsule are also possible.

The invention is applicable to any type of fuel element for a nuclear reactor.

I claim:

1. A nuclear fuel element comprising a tubular sheath having opposite ends and composed of a material resisting creep and corrosion under the action of a coolant at high pressure and high temperature of a nuclear reactor means closing said opposite ends pellets enclosed in the sheath and composed of a material having an influence on the nuclear reaction in a reactor, at least a part of which material is of fuel material, said element further comprising a plurality of modular capsules arranged one after the other axially within the sheath, each of the modular capsules comprising a tubular case having opposite ends, a porous element closing each of said opposite ends of the case and a stack of said pellets inserted without radial clearance inside the case, the case having an outside diameter which is such that, the radial clearance between the outer surface of the capsule and the inner surface of the sheath is in the range between 0.02 and 0.2 millimeter 2. A fuel element according to claim 1, wherein different capsules of the fuel element enclose fuel pellets having different enrichment contents of fissile material.

3. A fuel element according to claim 1, wherein at least one capsule of the fuel element encloses pellets composed of a neutron absorbing material.

4. A fuel element according to claim 3, wherein at least one capsule enclosing pellets composed of a neutron absorbing material is disposed at each of the ends of the fuel element.

5. A fuel element according to claim 1, wherein at least one capsule of the fuel element encloses a burnable poison.

6. A fuel element according to claim 5, wherein the capsule enclosing a burnable poison is disposed in the vicinity of a central part of the fuel element.

7. A modular capsule for a tubular sheath of a fuel element, said capsule comprising a tubular case having opposite ends pellets stacked axially within the tubular case and defining no radial clearance with the case, and a porous closing element closing each of said opposite ends of the case.

8. A modular capsule according to claim 7, wherein the porous closing elements are composed of a material absorbing product of fission.

9. A modular capsule according to claim 7, wherein the porous closing elements of the capsule are constituted by pellets disposed at the ends of the capsule.

10. A modular capsule according to claim 7, wherein the tubular case has a wall having a thickness of 0.15 to 0.30 mm.

11. A method for manufacturing a modular capsule for a tubular sheath of a fuel element, said capsule comprising a tubular case having opposite ends pellets stacked axially within the tubular case and defining no radial clearance with the case, and a porous closing element closing each of said opposite ends of the case, said method comprising closing in a sealed manner a first of said opposite ends of the tubular case by means of a plug having a chamafer, the chamfer facing toward the interior of the tublar case, introducing in the case until it comes into contact with the plug a porous pellet having a chamfer which faces toward the plug, filling the tubular case with pellets constituting a stack following on the porous pellet, placing after the last pellet introduced in the case and in contact with said last pellet a porous pellet having a chamfer facing toward the exterior of the case, closing a second of said opposite ends of the case in a sealed manner with a plug having a chamfer facing toward the last-mentioned porous pellet, placing the tubular case and the elements contained therein in a vessel under high pressure and high temperature, causing under high pressure and high temperature the application of the tubular case on the pellets, on said chamfers of the porous pellets and on the plugs respectively, and cutting the tubular case in the region of junctions between said chamfers

* * * * *